(12) United States Patent
Ootomo

(10) Patent No.: US 10,691,102 B2
(45) Date of Patent: Jun. 23, 2020

(54) MACHINING TECHNIQUE MANAGEMENT SYSTEM AND MACHINING TECHNIQUE MANAGEMENT METHOD

(71) Applicant: FANUC CORPORATION, Yamanashi (JP)

(72) Inventor: Yousuke Ootomo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 30 days.

(21) Appl. No.: 15/977,240

(22) Filed: May 11, 2018

(65) Prior Publication Data

US 2018/0373226 A1 Dec. 27, 2018

(30) Foreign Application Priority Data

Jun. 23, 2017 (JP) ................................. 2017-122807

(51) Int. Cl.
*G05B 19/4097* (2006.01)
(52) U.S. Cl.
CPC ..... *G05B 19/4097* (2013.01); *G05B 2219/35012* (2013.01)
(58) Field of Classification Search
CPC ........... G05B 19/4097; G05B 2219/35012
See application file for complete search history.

(56) References Cited

U.S. PATENT DOCUMENTS 6,401,004 B1 * 6/2002 Yamazaki ........ G05B 19/40937
700/159

2002/0091460 A1 * 7/2002 Allen ................ G05B 19/4166
700/173

(Continued)

FOREIGN PATENT DOCUMENTS

JP 2004-284002 10/2004
JP 2005-177924 7/2005

(Continued)

OTHER PUBLICATIONS

Notification of Reasons for Refusal dated Jun. 18, 2019 in Japanese Patent application No. 2017-122807.

*Primary Examiner* — Thomas C Lee
*Assistant Examiner* — Anzuman Sharmin
(74) *Attorney, Agent, or Firm* — Wenderoth, Lind & Ponack, L.L.P.

(57) ABSTRACT

A machining technique management system of an integrated system in which a CAD; a CAM; and a CNC machine tool are connected to a shared database, the machining technique management system including: a machining state recorder that, in a case of the CNC machine tool executing the machining, records request information indicating a request demanded in the machining, and state information indicating the machining execution state to be associated as machining execution information in the shared database; and a machining information manager that compares each set of the machining execution information in which at least part of the request information matches, and defines machining execution information which was determined as satisfying a request in the request information better than other machining execution information based on a comparison result, as a candidate for machining technique information to be used for creation of the machining command at the CAM.

9 Claims, 12 Drawing Sheets

(56) References Cited

U.S. PATENT DOCUMENTS

2015/0103156 A1* 4/2015 Northrup ............. G02B 21/365
                                                    348/79
2016/0019270 A1* 1/2016 Jones .................... G06F 16/248
                                                    700/98

FOREIGN PATENT DOCUMENTS

| JP | 5143005 | 11/2012 |
|----|---------|---------|
| JP | 2016-167319 | 9/2016 |
| WO | 2014/045383 | 3/2014 |

* cited by examiner

FIG. 2

MACHINING EXECUTION INFORMATION
◇ MACHINING COMMAND NUMBER
◇ CNC MACHINE TOOL NUMBER
◇ MACHINING COMMAND START TIME/DATE
◇ MACHINING COMMAND END TIME/DATE
◇ MOUNTED STATE OF WORK MATERIAL
◆ FIRST MACHINING STEP
◆ SECOND MACHINING STEP
    :
◆ $N^{th}$ MACHINING STEP

◆ FIRST TO $N^{th}$ MACHINING STEPS
  □ MACHINING STEP NUMBER
  □ MACHINING STEP START TIME/DATE
  □ MACHINING STEP END TIME/DATE
  □ TOOL NUMBER
  □ MACHINING FEATURE
  □ MATERIAL OF WORKPIECE
  □ CUTTING CONDITIONS
  □ STRATEGY
  □ APPROACH METHOD
  □ RETRACT METHOD
  ■ MACHINING REQUEST INFORMATION

■ MACHINING REQUEST INFORMATION
 · AIM OF MACHINING
 · CAM TOLERANCE
 · SURFACE ROUGHNESS
 · GEOMETRIC TOLERANCE,
   DIMENSIONAL TOLERANCE

MACHINING TECHNIQUE MANAGEMENT SYSTEM AND MACHINING TECHNIQUE MANAGEMENT METHOD

This application is based on and claims the benefit of priority from Japanese Patent Application No. 2017-122807, filed on 23 Jun. 2017, the content of which is incorporated herein by reference.

BACKGROUND OF THE INVENTION

Field of the Invention

The present invention relates to a machining technique management system and machining technique management method which manage information related to machining techniques.

Related Art

In the field of machining, CAD (computer-aided design), CAM (computer-aided manufacturing) and CNC (computerized numerical control) machine tools are used. In the case of using these, first the user designs a machined shape by way of CAD. Next, the user creates machining commands for machining into the designed machined shape by way of CAM. Then, the CNC machine tool executes the machining on a work based on the created machining commands. The user can thereby machine the work into the desired shape.

Herein, technology for assisting the creation of the machining commands using CAM by the user has been disclosed in Patent Document 1, for example. In the technology disclosed in Patent Document 1, process information upon machining execution is stored to be associated with a machining set. The user optimizes the machining process by referencing the stored information. It thereby becomes possible for the user to create machining commands corresponding to this optimized machining process.

Patent Document 1: Japanese Patent No. 5143005, Specification

SUMMARY OF THE INVENTION

However, for the creation of machining commands by a user, technical knowledge is required. For example, even in the case of using the aforementioned technology disclosed in Patent Document 1, technical knowledge is required also in order to put to use the process information being stored.

However, the knowledge related to such machining techniques is knowledge memorized by individual users, and is accumulated mainly from ones experiences. It is not easy to convey the knowledge obtained from such rules of thumb from one person to another by text or verbally is not easy. In addition, in the case of a certain user creating a machining command, an arrangement such that uses this created machining command in the creation of a machining command of another user is not sufficient.

Therefore, the present invention has an object of providing a machining technique management system and machining technique management method for creating high-quality machining commands irrespective of the knowledge of individual users.

A machining technique management system (for example, the machining technique management unit 50 and machining state recording unit 40 described later) according to a first aspect of the present invention is a machining technique management system of an integrated system (for example, the integrated system 1 described later) in which a CAD (for example, the CAD 10 described later) that outputs a machined shape; a CAM (for example, the CAM 20 described later) which creates a machining command for machining a workpiece into the machined shape; and a CNC machine tool (for example, the CNC machine tool 30 described later) which performs machining based on the machining command and outputs a machining execution state, are connected to a shared database (for example, the shared database 60 described later), the machining technique management system managing the machining technique state based on the machined shape, the machining command and the machining execution state, the machining technique management system including: a machining state recording unit (for example, the machining state recording unit 40 described later) that, in a case of the CNC machine tool executing the machining, records request information indicating a request demanded in the machining, and state information indicating the machining execution state to be associated as machining execution information in the shared database; and a machining information management unit (for example, the machining information management unit 50 described later) that compares each of a plurality of sets of the machining execution information in which at least part of the request information matches, and defines machining execution information which was determined as satisfying a request in the request information better than other machining execution information based on a comparison result, as a candidate for machining technique information to be used for creation of the machining command at the CAM.

According to a second aspect of the present invention, in the machining technique management system as described in the first aspect, the machining information management unit may be configured so as to compare the candidate for the machining technique information and existing machining technique information for which at least part of the request information matches with the candidate for the machining technique information and, in a case of determining based on a comparison result that the candidate for the machining technique information better satisfies the request in the request information, record in the shared database the candidate for the machining technique information as new machining technique information.

According to a third aspect of the present invention, in the machining technique management system as described in the second aspect, the machining information management unit may be configured so as to output, to the CAM, machining technique information that is recorded in the shared database and corresponds to a machining command to be created, in a case of the machining command being created at the CAM.

According to a fourth aspect of the present invention, in the machining technique management system as described in any one of the first to third aspects, it may be configured so that information indicating an aim of machining by the user having created the machining command is included in the request information, and at least part of the request information matching indicates at least the aim of machining matching.

According to a fifth aspect of the present invention, in the machining technique management system as described in any one of the first to fourth aspects, it may be configured so that the request information is included in the machining command for every machining step, and the machining state recording unit records the state information and the machining step including the request information in the shared database to be associated as machining execution information, for each of the machining steps.

According to a sixth aspect of the present invention, in the machining technique management system as described in any one of the first to fifth aspects, it may be configured so that the shared database allows for editing by a user.

According to a seventh aspect of the present invention, in the machining technique management system as described in any one of the first to sixth aspects, it may be configured so that a plurality of the CNC machine tool (for example, the first CNC machine tool 30a and second CNC machine tool 30b described later) and a plurality of the machining state recording unit (for example, the first machining state recording unit 40a and second machining state recording unit 40b described later) corresponding to the plurality of the CNC machine tool are connected to the shared database.

According to an eighth aspect of the present invention, in the machining technique management system as described in any one of the first to seventh aspects, the machining information management unit may be configured so as to: acquire an inspection result obtained by measuring the workpiece machined by the CNC machine tool, and perform determination regarding whether or not satisfying a request in the request information based on the inspection result in addition to the state information.

A machining technique management method according to a ninth aspect of the present invention is a machining technique management method for an integrated system (for example, the integrated system 1 described later) in which a CAD (for example, the CAD 10 described later) which outputs a machined shape; a CAM (for example, the CAM 20 described later) which creates a machining command for machining a workpiece into the machined shape; and a CNC machine tool (for example, the CNC machine tool 30 described later) which performs machining based on the machining command and outputs a machining execution state are connected to a shared database (for example, the shared database 60 described later), the machining technique management method managing machining technique states based on the machined shape, the machining command and the machining execution state, the method including the steps of: recording, in a case of the CNC machine tool executing the machining, a machining step including request information indicating a request demanded in the machining, and state information indicating the machining execution state to be associated as machining execution information in the shared database; and comparing the state information of a plurality of sets of the machining execution information for which at least part of the request information match, and defining machining execution information which was determined as satisfying the request in the request information better than other machining execution information based on the state information thus compared, as a candidate for machining technique information to be used for creation of the machining command at the CAM.

According to the present invention, it becomes possible to create a high-quality machining command irrespective the knowledge of individual users.

BRIEF DESCRIPTION OF THE DRAWINGS

FIG. 2 is a view showing an example of machining execution information of an embodiment of the present invention;

DETAILED DESCRIPTION OF THE INVENTION

Next, an embodiment of the present invention will be explained in detail by referencing the drawings.

Configuration of Embodiment

Figure 1:
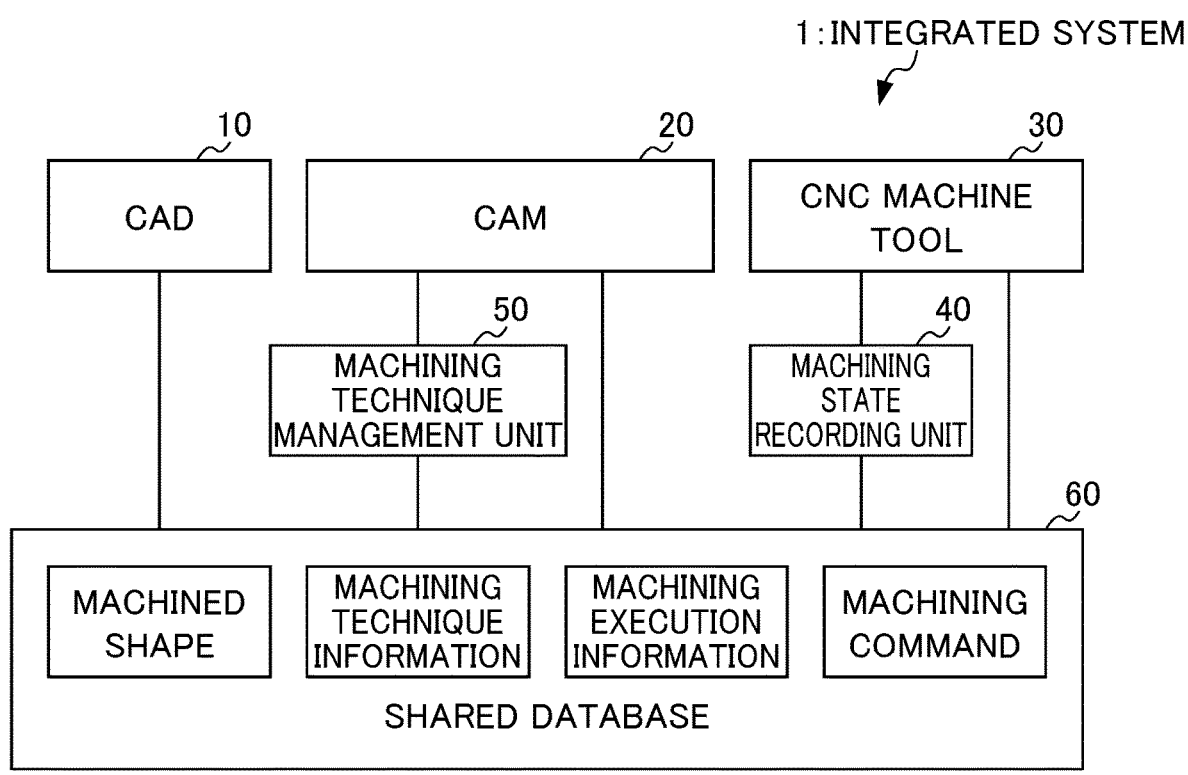
FIG. 1 is a view showing a basic configuration of an overall embodiment of the present invention.

As shown in FIG. 1, an integrated system 1 which is the present embodiment includes a CAD 10, CAM 20, CNC machine tool 30, machining state recording unit 40, machining technique management unit 50 and shared database 60.

The CAD 10 is a device which aids in the user designing a machined shape. In addition, the CAM 20 is a device which aids in creation of machining commands for machining a workpiece (work) into the machined shape which was designed by way of the CAD 10. Furthermore, the CNC machine tool 30 is a numerical control device including a machine tool which executes machining on the workpiece, based on the machining commands generated by the CAM 20. The specific configurations and functions of these devices are well known to those skilled in the art; therefore, detailed explanations will be omitted herein.

The shared database 60 is a shared database connected to be readable and writable with each of the CAD 10, CAM 20 and CNC machine tool 30. The CAD 10, CAM 20 and CNC machine tool 30 can share various types of information by performing exchange of information mutually via the shared database 60.

As shown in FIG. 1, for example, the machined shape, machining technique information, machining execution information and machining command are included as information stored in the shared database 60. The machined shape is designed by way of CAD 10 as mentioned above. The machining technique information is information serving as a reference by the user upon creation of the machining command. In the machining technique information, for example, setting examples of machining contents such as machined shapes, cutting conditions, strategies, approach methods, and retract methods for machining commands are included. The machining technique information is managed by the machining technique management unit 50. The user creates a machining command for machining the workpiece into the machined shape, while referencing the machining technique information read by the CAM 20. Settings of the aforementioned machining contents are included in the machining commands. In addition, although the details are described later, information indicating the aim of the user having created the machining command is also included in the machining command of the present embodiment. The machining execution information is information indicating the state during machining execution based on the machining command by way of the CNC machine tool 30. The machining execution information is managed by the machining state recording unit 40. The details of the machining technique information and machining execution information will be described later.

It should be noted that this information illustrated in the drawings is merely an example, and it may be configured so that other information is stored in the shared database 60. For example, it may be configured so that resource information such as of tools related to machining, machine tools, etc. is stored therein.

The machining state recording unit 40 and machining technique management unit 50 are portions for managing the machining technique information in the integrated system 1. It should be noted that the machining state recording unit 40 and machining technique management unit 50 correspond to a machining technique management system of the present invention.

The machining state recording unit 40 performs generation and storage of machining execution information every time a machining command is executed by the CNC machine tool 30, etc. More specifically, the CNC machine tool 30 outputs servo information and various sensor data information obtained during machining command execution to the machining state recording unit 40. In addition, a camera (not illustrated) photographs pictures during machining command execution, and outputs the photographed pictures to the machining state recording unit 40. The machining state recording unit 40 collects this information (servo information, various sensor data information and captured images of machining state), and generates machining execution information by linking with information such as the machining contents and aim of machining included in the machining command. Then, the machining state recording unit 40 stores the generated machining execution information in the shared database 60.

The machining technique management unit 50 updates the existing machining technique information stored in the shared database 60, by analyzing and extracting this machining execution information with the indices of information such as the aim of machining included in the machining execution information generated/stored by the machining state recording unit 40. The analyzed and extracted machining technique information according to indices such as the aim of the user is thereby accumulated and updated. The accumulated and updated machining technique information is presented to the user upon the user creating a machining command by way of the CAM 20. The user can create a machining command while making reference to the presented machining technique information. In other words, according to the present embodiment, it becomes possible to create a high-quality machining command along the aim of the user, irrespective of the knowledge of individual users creating the machining command.

The respective devices included in the present embodiment have been explained above. Each of these respective devices includes an arithmetic processing unit such as a CPU (Central Processing Unit). In addition, each of these respective devices includes an auxiliary storage device such as a HDD (Hard Disk Drive) storing various control programs such as application software and the OS (Operating System), and a main storage device such as RAM (Random Access Memory) for storing data that is necessitated temporarily upon the arithmetic processing unit executing programs.

Then, in each of these respective devices, the arithmetic processing unit reads out the application software and/or OS from the auxiliary storage device, and performs arithmetic processing based on this application software and/or OS, while expanding the read application software and/or OS in the main storage device. In addition, based on these computation results, the various hardware possessed by each of these respective devices is controlled. The functional blocks of the present embodiment are thereby realized. In other words, the present embodiment can be realized by hardware and software cooperating.

<Details of Machining Execution Information>

Next, an explanation will be made for the detailed contents of machining execution information generated by the machining state recording unit 40 by referencing FIG. 2.

The machining execution information is data having a layered structure as shown in FIG. 2. More specifically, information indicating the machining command number, CNC machine tool number, machining command start time/date, machining command end time/date, and mounting state of work material; and information of a singular or a plurality of machining steps in the case of defining the unit of machining one type of machined shape by one type of tool as a machining step, are included in the machining execution information, which is the upper layer. In the drawing, information from the first machining step to $N^{th}$ (N is any natural number) machining step is illustrated as information of machining steps.

In addition, for a singular number or each of a plurality of machining steps, items related to management such as the machining step number, machining step start time/date, machining step end time/date; information related to machining contents such as the tool number, machined shape, cutting conditions, strategy, approach method, and retract method; and machining request information are included in the respective information for the first machining step until the $N^{th}$ machining step, which are intermediate layers.

Furthermore, the aim of machining, material of the workpiece, machining feature, CAM tolerance, surface roughness, geometric tolerance and dimensional tolerance are included in the machining request information, which is the lower layer.

It should be noted that the aforementioned respective information and layered structure are merely exemplifications, and the information and layered structure included in the machining execution information of the present embodiment is not to be limited to the contents of this exemplification. For example, as the machining contents of the intermediate layer, information such as the machining step name, spindle rotation speed, cutting feed rate, feed amount per one blade, cutting depth, cut width, valid function, and tool path may be further included as machining contents of the intermediate layer. In addition, part of the exemplified information may not be included.

In the present embodiment, the user uses CAM 20 to create a machining command by way of writing the machining contents (corresponding to information of the aforementioned intermediate layer) and machining request information (corresponding to information of the aforementioned lower layer) for every machining step. Then, upon execution of this machining command, the machining state recording unit 40 generates machining execution information.

Herein, the information such as an identification number included in the upper layer of the machining execution information is common log information, and the information indicating the machining contents included in the intermediate layer is information commonly written during machining command creation; therefore, a detailed explanation for this information will be omitted. The machining request information included in the lower layer includes information unique to the present embodiment; therefore, explanation will be made in detail.

The machining request information is written in the machining command by the user, upon the user creating the machining command using the CAM 20. The writing of the contents of the machining request information may be performed by the user inputting any character string as text, or may be performed by the user selecting from character strings prepared in advance. Next, the respective information included in the machining request information will be explained.

The aim of machining is information indicating a request demanded in machining by the user having created the machining command. As an example of the aim of machining, machining man-hours minimum, tool cost minimum, machining quality emphasis, machining man-hours minimum disregarding surface roughness, energy saving machining, machining surface quality emphasis, etc. can be exemplified.

The material of the workpiece is the material of the workpiece (work) serving as the target of performing machining with the machining command. As an example of materials of the workpiece, aluminum, brass, stainless steel, iron, titanium, etc. can be exemplified. The machining feature is a characteristic of the machined shape to be machined with the machining command. As an example of the machining feature, a flat surface, hole, groove, pocket, embossing, etc. can be exemplified.

The CAM tolerance is an allowed value of precision in the case of performing three-dimensional machining such as free-form surface machining with the machining command. The CAM tolerance is indicated by a value with units of "mm", for example. The surface roughness is a state of irregularity of the machined surface to be machined with the machining command. The surface roughness is indicated by a value with units of "Ra" as the arithmetic mean roughness, for example.

The geometric tolerance is the difference allowed for the geometrically correct shape and position. In addition, dimensional tolerance is the difference allowed for dimensions. The geometric tolerance and dimensional tolerance are indicated by values with units of "mm" indicating the allowed difference, for example.

Figure 3:
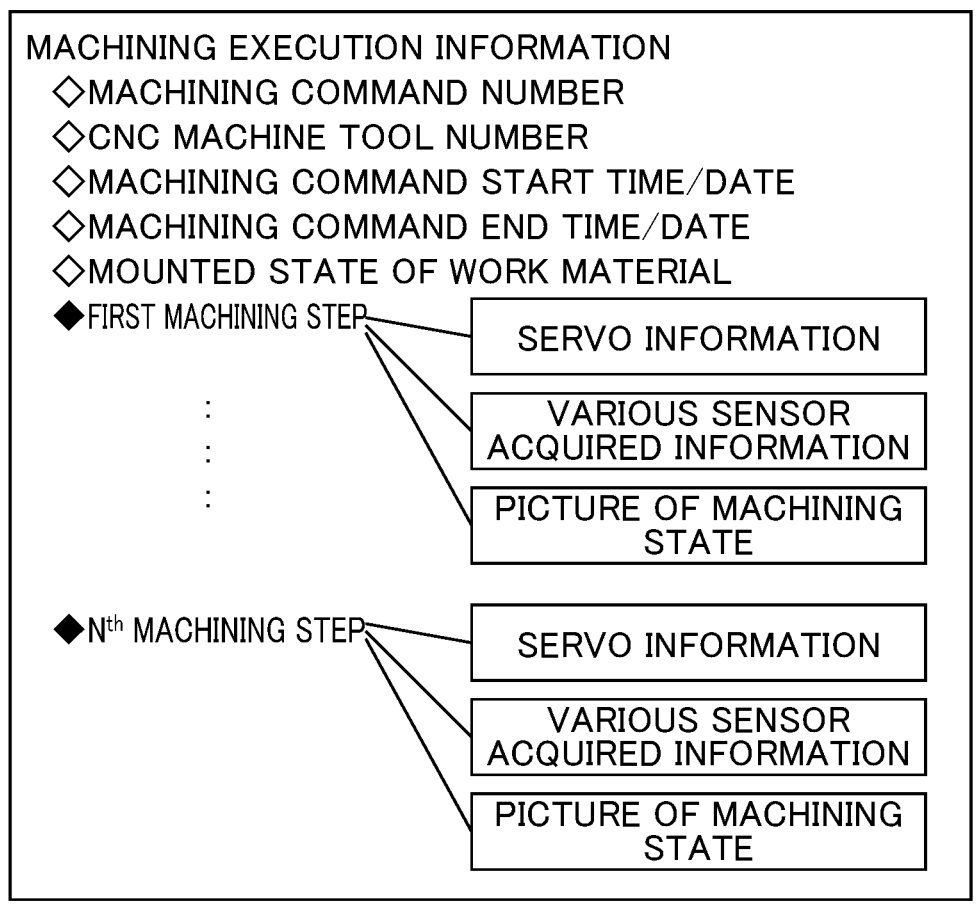
FIG. 3 is a view showing an example of information added to the machining execution information of an embodiment of the present invention.

Next, an explanation will be made by referencing FIG. 3 for information indicating the state during execution of a machining command, linked to the machining execution information. In the machining execution information as shown in FIG. 3, various types of sensor data information, servo information, and photographed moving images during machining are linked to every machining step, as information indicating the execution state of a machining command.

As examples of the various types of sensor information, the deformation amount of the work material, atmospheric temperature information, machine temperature information, coolant temperature information, acceleration sensor data, AE (Acoustic Emission) sensor data, and audio sensor data can be exemplified.

In addition, as examples of servo information, information related to servomotors such as the spindle motor electrical-current value, each feed axis motor electrical-current value, spindle motor load, each feed axis motor load, spindle override, and feed axis speed override can be exemplified.

Furthermore, as examples of the photographed moving images during machining, moving images photographing the workpiece and tool, and machining points during machining execution can be exemplified.

<Generation and Storage Operations for Machining Execution Information>

The machining state recording unit 40 generates the aforementioned such machining execution information every time a machining command is executed by the CNC machine tool 30. Then, the machining state recording unit 40 stores the machining execution information thus generated in the shared database 60. The operation of this machining state recording unit 40 will be explained by referencing the sequence chart of FIG. 4.

In Step S11, the CNC machine tool 30 starts execution of machining based on the machining command. In addition, the event of starting execution of machining is notified to the machining state recording unit 40. In Step S21, the machining state recording unit 40 which has been notified of the start of execution of machining then starts the collection of information indicating the execution state of the machining command, in order to generate machining execution information. More specifically, the collection of the aforementioned various sensor data information, servo information and photographed moving images during machining is started. Collection is performed in every machining step as mentioned above.

In Step S12, the CNC machine tool 30 starts execution of the first machining step based on the machining command. In Step S22, the machining state recording unit 40 starts the collection of information indicating the execution state of the first machining step.

In Step S13, the CNC machine tool 30 ends the execution of the first machining step. In Step S23, the machining state recording unit 40 ends the collection of information indicating the execution state of the first machining step.

Then, the CNC machine tool 30 and machining state recording unit 40 repeat similar processing to Step S12, Step S13, Step S22 and Step S23 in every machining step. This repetition is omitted from illustration.

Subsequently, in Step S14, the CNC machine tool 30 ends the execution of the $N^{th}$ machining step. In Step S24, the machining state recording unit 40 ends the collection of information indicating the execution state of the $N^{th}$ machining step.

In Step S15, the CNC machine tool 30 ends the execution of machining based on the machining command. In addition, the event of ending the execution of machining is notified to the machining state recording unit 40. In Step S25, the machining state recording unit 40 that has been notified of the ending of the execution of machining then ends the collection of information indicating the execution state of the machining command.

In Step S26, the machining state recording unit 40 generates machining execution information based on the information collected in each of the aforementioned steps, and the contents of the machining commands executed by the CNC machine tool 30 in each of the aforementioned steps. Then, the machining state recording unit 40 stores the machining execution information thus generated in the shared database 60. According to the above explained operations, the machining execution information is generated and accumulated in the shared database 60, every time a machining command is executed by the CNC machine tool 30.

<Selection of Machining Technique Candidate>

Next, an explanation will be made for the method whereby the machining technique management unit 50 selects a machining technique candidate from among the machining execution information accumulated in the shared database 60.

As mentioned above, the machining execution information is accumulated; however, even if all of this accumulated machining execution information were presented to the user, it would not be possible for the user to determine which machining execution information would be good to reference to create the machining command. Therefore, the machining technique management unit 50 selects machining execution information determined as being significant for the creation of the machining command from among the accumulated machining execution information based on a predetermined criterion, as a candidate to be the machining technique information (hereinafter referred to as "machining technique candidate").

Figure 4:
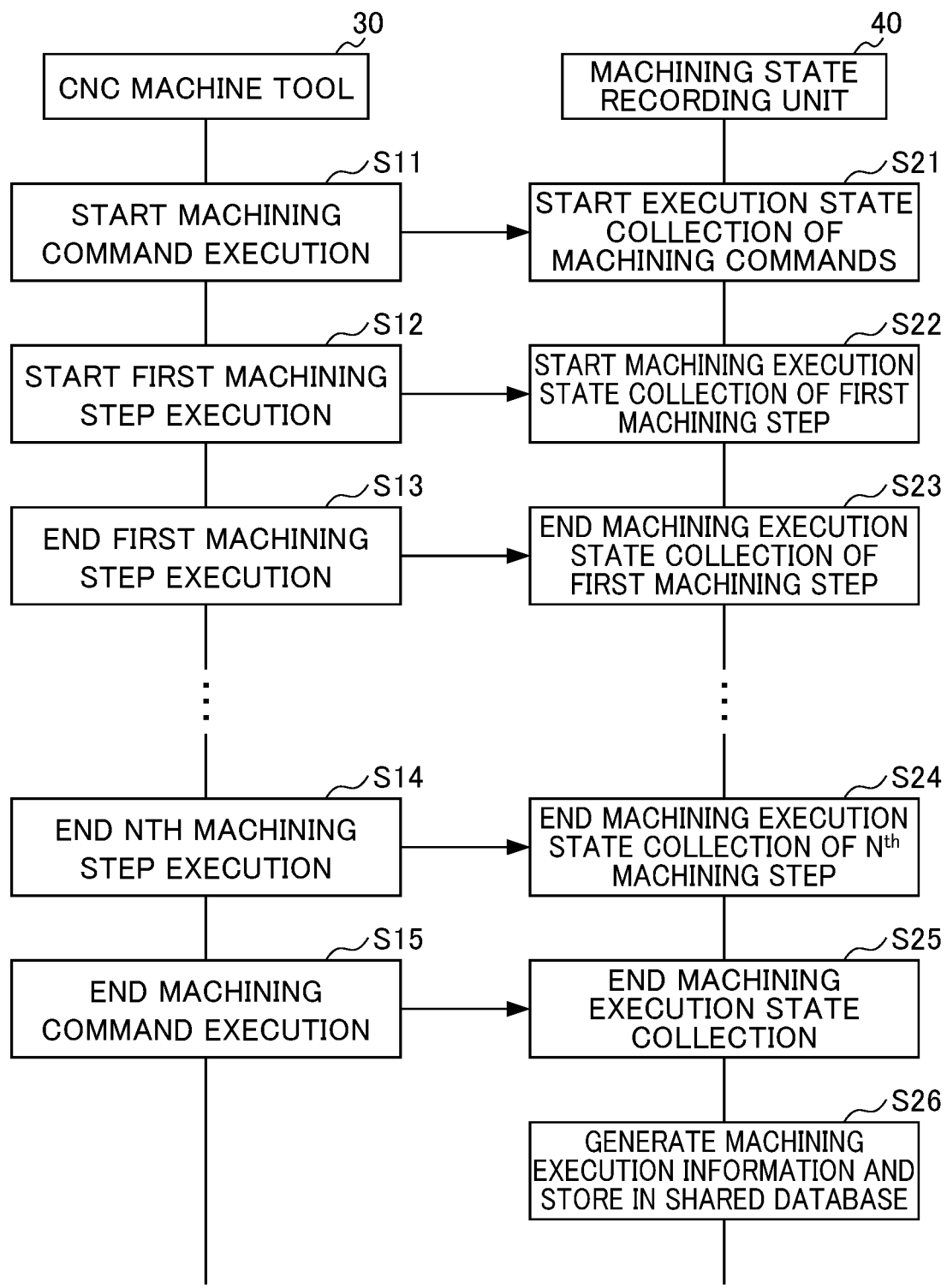
FIG. 4 is a flowchart showing operations during collection of machining execution information of an embodiment of the present invention.
Figure 5:
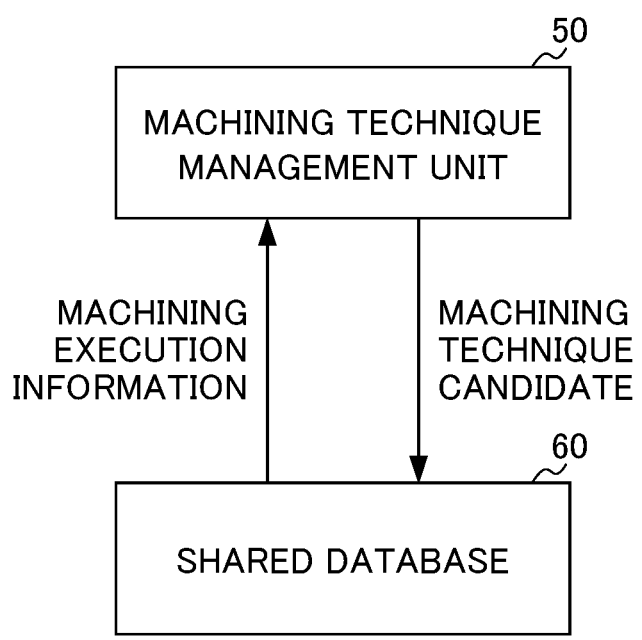
FIG. 5 is a view showing a state during output of a machining technique candidate of an embodiment of the present invention.

As shown in FIG. 4, the machining technique management unit 50 acquires machining execution information which satisfies predetermined conditions from among the machining execution information accumulated in the shared database 60. Then, the machining technique management unit 50 selects machining execution information which was determined as being significant for the creation of a machining command, from the plurality of sets of machining execution information acquired, and stores in the shared database 60 with the selected machining execution information as a machining technique candidate. The selection of the machining technique candidate is performed on as the event of a predetermined number of sets of new machining execution information being accumulated, or a predetermined time having elapsed since the previous selection.

Herein, the machining technique management unit 50 defines sets of machining execution information for which the aim of machining, material of the workpiece, and machining feature included in machining steps containing the machining request information are respectively matching as the targets of comparison, and selects a machining technique candidate from among the sets of machining execution information as the target of this comparison. For this reason, the machining state recording unit 40 may be configured so as to store by categorizing into every combination of aim of machining, material of workpiece and machining feature, upon storing sets of the machining execution information in the shared database 60.

The machining request information is inputted as text consisting of any character string by the user as mentioned previously. For this reason, even if being information of the same contents, the character string may differ for every user. For example, in the case of the user writing a character string of "machining man-hours minimum" as the aim of machining, there can be a case where another user writes a character string of "minimize machining man-hours" for the same contents. In this case, although the character strings themselves do not match, the contents themselves for the aim of machining of the user match.

In a case of the expressions of such character strings differing, but the contents themselves for the aim matching, it is necessary to configure so that it is possible to judge that these character strings match. Therefore, the machining technique management unit 50 has a function of dividing a character string into morphemes by way of morpheme analysis, and a function of judging whether the character strings match by comparing the respective morphemes using a known thesaurus, for example. The machining technique management unit 50 can thereby judge that these character strings match in a case such that the expressions of the character strings differ, but the aims themselves match.

The machining technique management unit 50 reads sets of machining execution information in which the aim of machining, material of the workpiece, and machining feature respectively match in this way from the shared database 60. Then, the sets of machining execution information serving as comparison targets are further refined from the read sets of machining execution information.

More specifically, in the aim of machining, a designation of information for which the contents should agree is further included among the respective information in the machining step which includes machining request information. For example, as explained by referencing FIG. 2, as information other than the aim of machining, for example, the material of the workpiece, machining feature, CAM tolerance, surface roughness, geometrical tolerance and dimensional tolerance are included in the machining step including machining request information. Then, as information required to agree, the CAM tolerance and surface roughness shall be designated. In this case, the machining technique management unit 50 defines sets of machining execution information for which the contents of CAM tolerance and surface roughness agree as the comparison targets.

In other words, the machining technique management unit 50 first defines as a first condition the matter of the aim of machining, material of the workpiece, and machining feature included in the sets of machining execution information respectively matching in order to select machining technique candidates. Next, the machining technique management unit 50 defines as a second condition the matter of contents agreeing for sets of information designated as information for which the contents should agree. Then, the machining technique management unit 50 defines the sets of machining execution information satisfying both the first condition and the second condition as comparison targets. An explanation will be made using a specific example for the first condition and the second condition.

First Example

Case of Aim of Machining Being Machining Man-Hours Minimum

For example, in the request information created by the user, in the case of the aim of machining being "machining man-hours minimum", then "CAM tolerance" and "surface roughness" shall be designated as information required to be agreeing.

In this case, the machining request information shall have been set as described below in each of machining execution information A, machining execution information B and machining execution information C. It should be noted that, as a premise, the material of the workpiece and the machining feature shall match in the respective machining execution information.

Machining execution information A: aim of machining "machining man-hours minimum", CAM tolerance "0.001", surface roughness "3.2", dimensional tolerance "any", geometric tolerance "any"

Machining execution information B: aim of machining "machining man-hours minimum", CAM tolerance "0.001", surface roughness "3.2", dimensional tolerance "any", geometric tolerance "any"

Machining execution information C: aim of machining "machining man-hours minimum", CAM tolerance "0.001", surface roughness "0.4", dimensional tolerance "any", geometric tolerance "any"

The above-mentioned three sets of execution information satisfy the first condition since the aims of machining agree. In addition, since the values of CAM tolerance or surface roughness respectively agree for machining execution information A and machining execution information B, the second condition is also satisfied. Consequently, this machining execution information A and machining execution information B are defined as comparison targets. On the other hand, for the machining execution information C, the value of surface roughness is "0.4", and the values for surface roughness of machining execution information A and machining execution information B differ therefrom at "3.2". For this reason, machining execution information C does not become a comparison target with machining execution information A and machining execution information B.

Next, by comparing this machining execution information A and machining execution information B, the machining execution information determined as being significant for creation of a machining command is selected as a machining technique candidate. Herein, the machining technique management unit 50 determines information satisfying the aim of machining as being significant for creation of a machining command, and selects as a machining technique candidate. A criterion for determining as being significant for creation of this machining command and selecting as a machining technique candidate is set in advance by the user.

An example of this selection criterion will be explained. For example, in the case of the aim of machining being "machining man-hours minimum", the cutter feed rate, cut width and cutting depth for every machining step, which are included in the intermediate layer of the machining execution information, are multiplied. The value calculated by this multiplication corresponds to a removed volume per unit time.

Then, the sizes of values corresponding to this calculated removed volume are compared, and the machining execution information which comes to be the greatest numerical value is selected as a machining technique candidate of machining man-hours minimum (CAM tolerance 0.001, surface roughness 3.2). The machining technique management unit 50 stores the machining technique candidate selected in this way in the shared database 60. Next, second to sixth examples will be explained as examples other than the above-mentioned first example.

Second Example

Case of Aim of Machining Being Tool Cost Miminum

Information required to agree: Aim of machining Selection criterion: in order to define the information for which the tool cost per unit removed volume becomes lowest as the best, the machining technique management unit 50 compares the results of calculating "tool cost per 1 tool/tool lifespan hours/removed volume per unit time", and selects the machining execution information achieving the smallest value as a machining technique candidate.

Third Example

Case of Machining Quality Emphasis

Information required to agree: Aim of machining, CAM tolerance, surface roughness, dimensional tolerance and geometric tolerance Selection criterion: Since the measurement information is associated with the machining execution information, the machining technique management unit 50 knows if the workpiece machined according to this machining execution information is a good article or an inferior article. The defective rate is calculated based on this, and machining execution information having the lowest defective rate is selected as a machining technique candidate.

Fourth Example

Case of Machining Man-Hours Minimum Disregarding Surface Roughness

Information required to agree: Aim of machining Selection criterion: Regardless of whether or not the request of machining (CAM tolerance, surface roughness, dimensional tolerance and geometric tolerance) agrees, the machining technique management unit 50 compares the sizes of values for the removed volume per unit time, and selects a set of machining execution information which achieves the greatest numerical value as a machining technique candidate.

Fifth Example

Case of Energy Saving Machining

Information required to agree: Aim of machining Selection criterion: The machining technique storage unit 50 compares the electrical power consumption per unit removed volume from the data of electrical power consumption in each axis (X axis, Y axis, Z axis, A axis, B axis, C axis, spindle), and selects a set of machining execution information having the lowest electrical power consumption as a machining technique candidate.

Sixth Example

Case of Machining Surface Quality Emphasis

Information required to agree: Aim of machining, CAM tolerance and surface roughness Selection criterion: The machining technique management unit 50 selects a set of machining execution information for which machining was done on a workpiece having the most favorable machined surface quality based on inspection information of the workpiece, as a machining technique candidate.

It should be noted that, the aforementioned First Example to Sixth Example are merely exemplifications, and the information required to agree and selection criterion can be set arbitrarily by the user creating a machining command. Furthermore, the machining technique management unit 50 may be configured to save the removed volume and/or tool cost calculated based on the selection criterion, to be associated with the machining execution information in the shared database 60.

<Selection Operation for Machining Technique Candidate>

Figure 6:
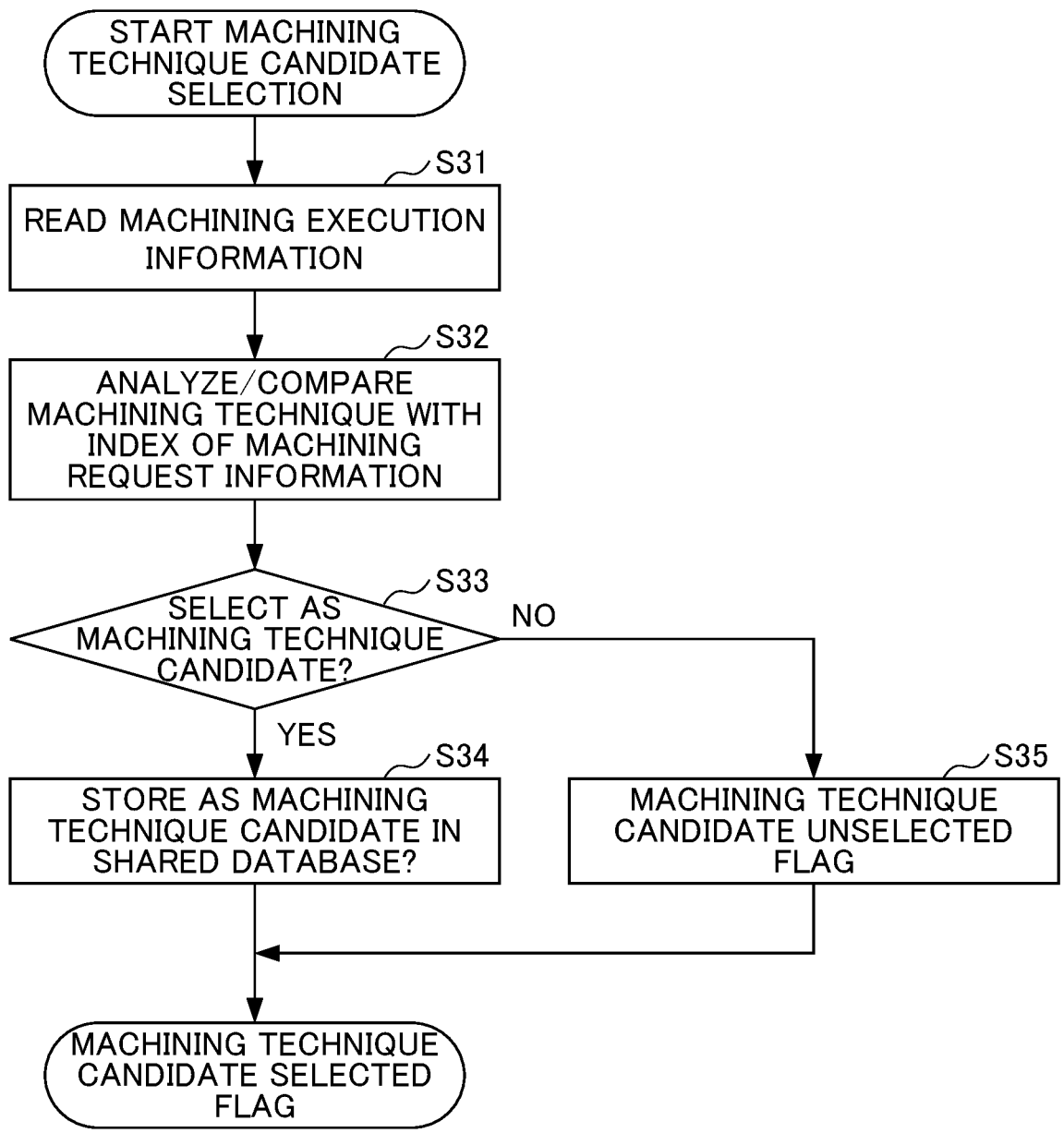
FIG. 6 is a flowchart showing operations during selection of a machining technique candidate of an embodiment of the present invention.

Next, an explanation will be made by referencing the flowchart of FIG. 6 for the operations upon the machining technique management unit 50 selecting a machining technique candidate from among the sets of machining execution information accumulated in the shared database 60. In Step S31, the machining technique management unit 50 reads sets of machining execution information from the shared database 60. In Step S32, the sets of machining execution information are analyzed and compared with the machining request information as an index. The specific method is as mentioned above as <Selection of Machining Technique Candidate>.

In Step S33, it is determined whether or not to select the machining execution information read this present time as a machining technique candidate. In the case of selecting as a machining technique candidate, it is determined as YES in Step S33, and the processing advances to Step S34. Then, in Step S34, the machining execution information read this present time is stored in the shared databased 60 as a machining technique candidate. The present processing thereby ends.

In the case of not selecting as a machining technique candidate, it is determined as NO in Step S33, and the processing advances to Step S35. Herein, the matter of not selecting as a machining technique candidate indicates the matter of more significant machining execution information existing. For this reason, the machining execution information read this present time is not selected as a machining technique candidate thereafter. Therefore, it sets a machining technique candidate unselected flag so as not to define as a target of the present processing thereafter. Then, the machining execution information read this present time is excluded from the targets of the present processing. The present processing thereby ends. According to the operations explained above, it becomes possible to extract significant information from among the sets of machining execution information, and select as a machining technique candidate. In addition, in order to prevent the number of machining technique candidates from excessively increasing, it is possible to configure so as to be able to select only more refined information as a machining technique candidate, by following a process of comparing the presently selected machining technique candidates with existing machining technique candidates or existing machining technique information, similarly to the above-mentioned selection operation of machining technique candidates.

<Updating of Machining Technique Information>

Next, an explanation will be made for the method whereby the machining technique management unit 50 updates existing machining technique information being stored in the shared database 60.

As mentioned above, the machining technique management unit 50 selects a machining technique candidate from among sets of machining execution information on the event of a predetermined number of new sets of machining execution information being accumulated, or a predetermined time having elapsed since a previous selection. Subsequently, the machining technique management unit 50 performs processing for deciding whether or not to newly define this machining technique candidate as machining technique information. It should be noted that this processing is performed on the event of a new machining technique candidate being selected, or a predetermined time having elapsed since performing the previous processing.

Figure 7:
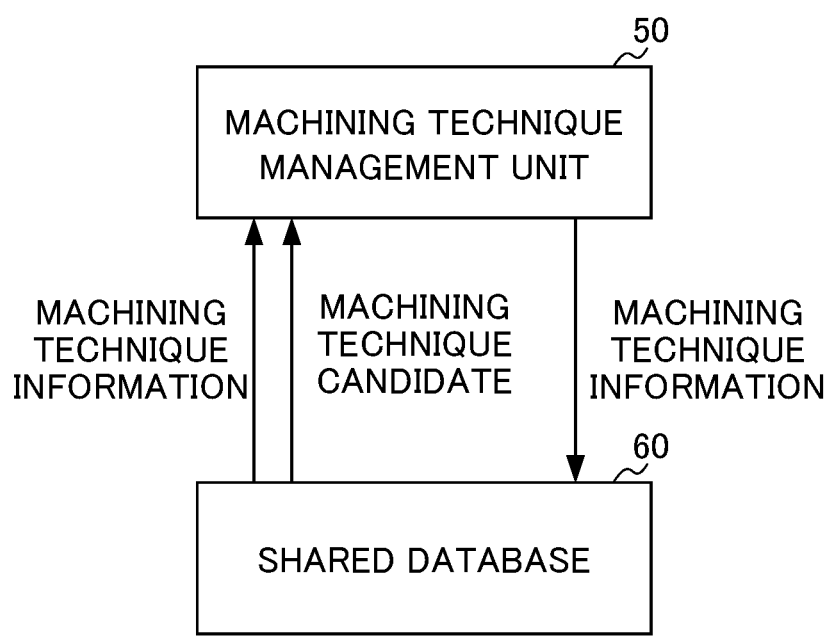
FIG. 7 is a view showing a state during updating of machining technique information of an embodiment of the present invention.

More specifically, the machining technique management unit 50 acquires a machining technique candidate, and existing machining execution information for which the aim of machining, material of the workpiece and machining feature respectively match with this machining technique candidate, from the shared database 60 as shown in FIG. 7. Then, it is decided whether to update the contents of the acquired existing machining technique information to the contents of the machining technique candidate.

Herein, the machining technique management unit 50 can perform the decision of whether or not to update the machining technique information based on the contents of the machining technique candidate, by the same method as the aforementioned <Selection of Machining Technique Candidate>. The machining technique management unit 50 decides whether having any significance, based on different selection criterions according to the aim of machining, as in the aforementioned First Example to Sixth Example.

The machining technique management unit 50, if determining the existing machining technique information as more significant, does not perform updating of the machining technique information. On the other hand, the machining technique management unit 50, if determining the machining technique candidate as more significant, updates the machining technique information by overwriting the existing contents of the machining technique information with the contents of the machining technique candidate. The machining technique management unit 50 may be configured so as to allow the user to select whether or not to newly store this machining technique candidate in the shared database 60 as machining technique information.

It should be noted that, in the case assuming that a set of existing machining execution information for which the aim of machining, material of the workpiece, and machining feature respectively match with the machining technique candidate has not been registered in the shared database 60, the machining technique management unit 50 newly stores this machining technique candidate in the shared database 60 as the machining technique information. In this case, the machining technique management unit 50 may be configured so as to allow the user whether or not to newly store this machining technique candidate as the machining technique information in the shared database 60.

<Update Operation of Machining Technique Information>

Figure 8:
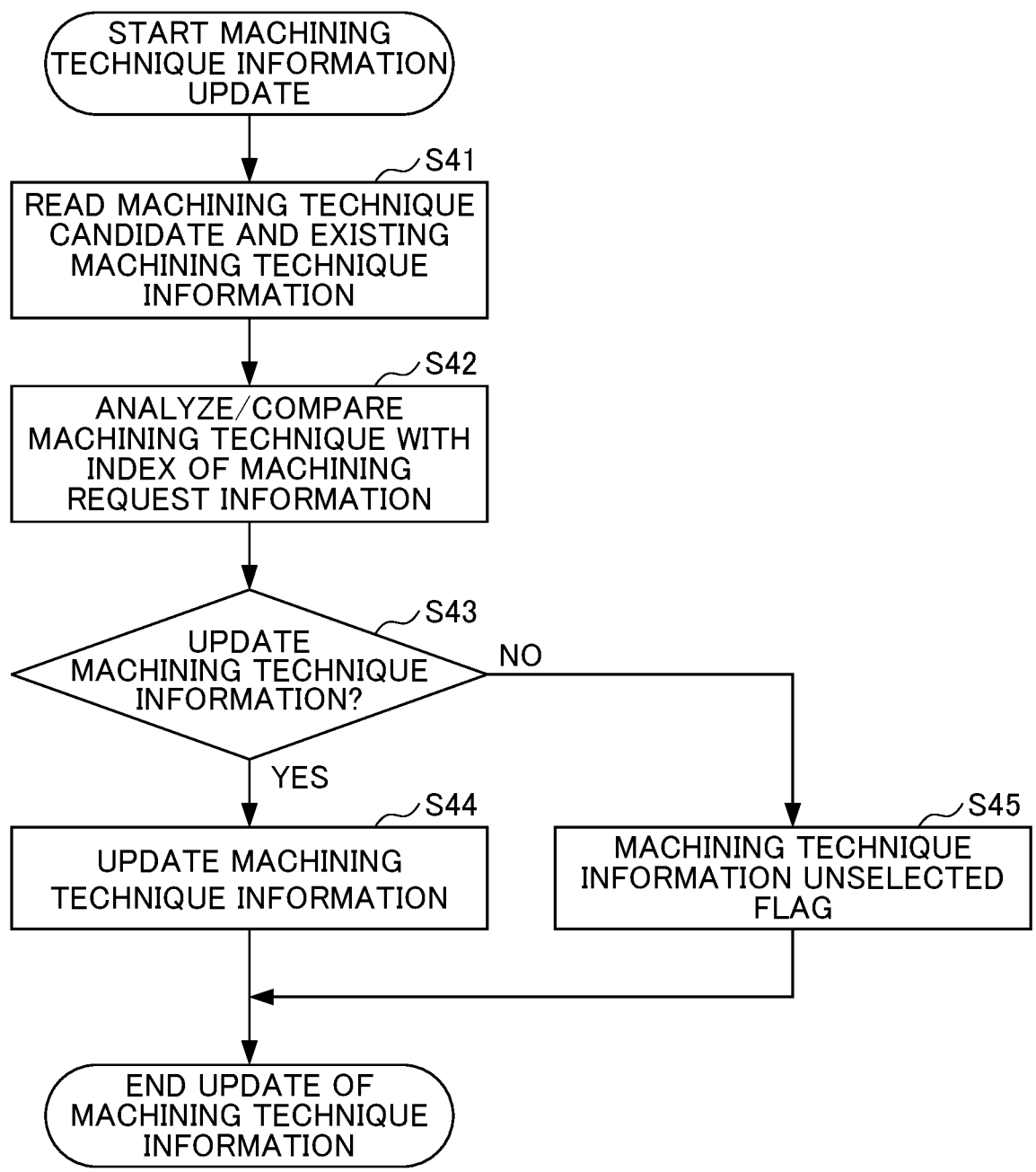
FIG. 8 is a flowchart showing operations during updating of machining technique information of an embodiment of the present invention.

Next, an explanation is made by referencing the flowchart of FIG. 8, for operations upon the machining technique management unit 50 making update of the machining technique information in the aforementioned away.

In Step S41, the machining technique management unit 50 reads the machining technique candidate and existing machining technique information from the shared database 60. In Step S42, the machining technique candidate and machining technique information are analyzed and compared with the machining request information as an index. The specific method is the same as the aforementioned method as <Selection of Machining Technique Candidate>.

In Step S43, the machining technique management unit 50 determines whether to update the machining technique information. In the case of updating the machining technique information, it is determined as YES in Step S43, and the processing advances to Step S44.

Then, in Step S44, the machining technique management unit 50 updates the machining technique information, by overwriting the contents of the existing machining technique information with the contents of the machining technique candidate. The processing thereby ends.

In the case of not updating the machining technique information, it is determined as NO in Step S43, and the processing advances to Step S45. Herein, the matter of not updating the machining technique information indicates the matter of the existing machining execution information being more significant than the machining technique candidate read this present time. For this reason, the machining technique candidate read this present time will not be made the machining technique information thereafter. Therefore, the machining technique management unit 50 sets a machining technique information unselected flag, so as not to make the target of the present processing thereafter. Then, thereafter, the machining technique management unit 50 excludes the machining technique candidate read this present time from the target of the present processing. The processing thereby ends. According to the above explained operations, the machining technique management unit 50, in the case of the machining technique candidate being more significant than the existing machining technique information, can update the machining technique information by the machining technique candidate.

<Presentation of Machining Technique Information>

Next, an explanation will be made for the method whereby the machining technique management unit 50 presents machining technique information to the user who creates a machining command by way of the CAM 20. As mentioned above, the machining technique management unit 50 stores information which is significant based on the machining execution information in the shared database 60 as the machining technique information. In the present embodiment, the machining technique information stored in the shared database 60 is presented to the user who creates a machining command by way of the CAM 20.

Figure 9:
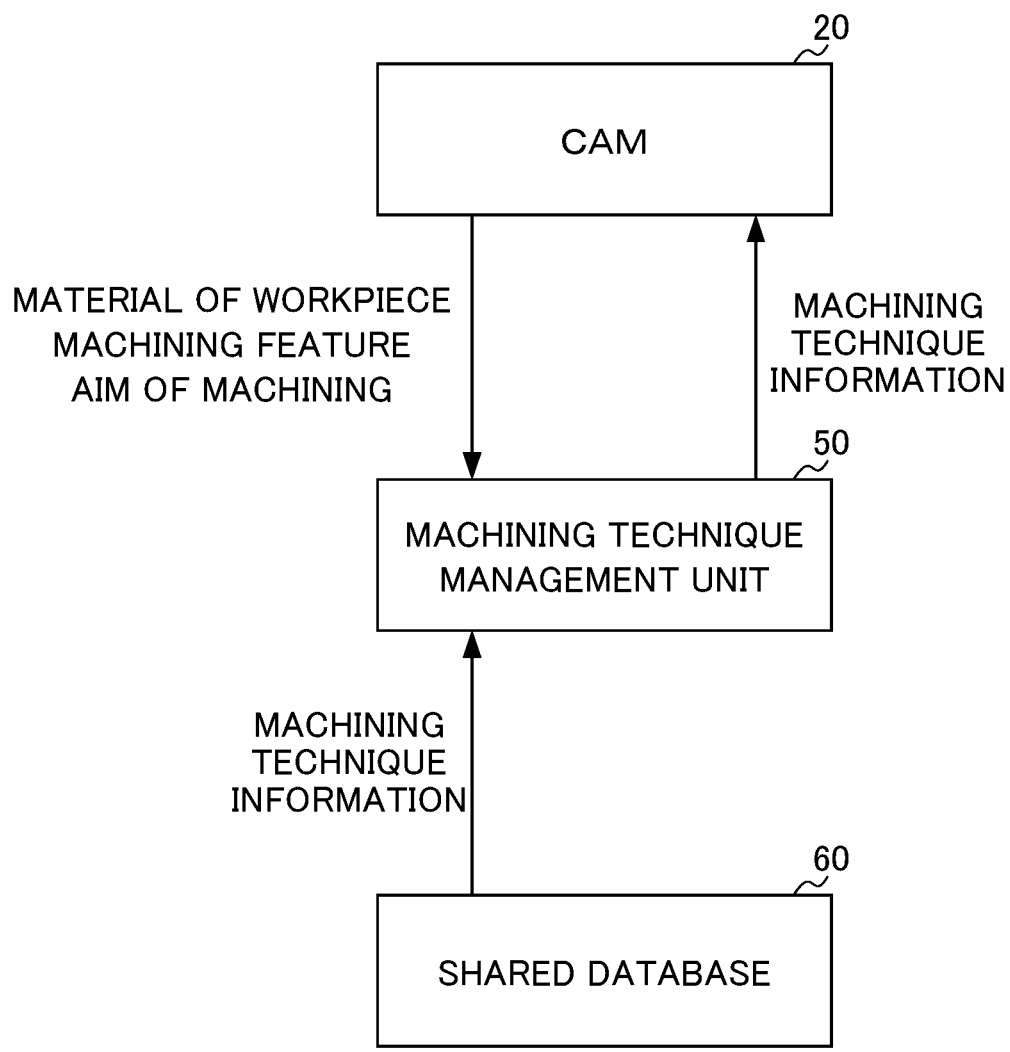
FIG. 9 is a view showing the state during presentation of machining technique information of an embodiment of the present invention.

More specifically, into the CAM 20, the user trying to create a machining command from these first inputs the material of the workpiece, machining feature and aim of machining corresponding to the machining command to be created from thereon. When this is done, the machining technique management unit 50 acquires from the CAM 20 the material of the workpiece, machining feature and aim of machining thus inputted, as shown in FIG. 9. Next, the machining technique management unit 50 extracts machining technique information corresponding to the acquired information thereof by searching the shared database 60. Then, the machining technique management unit 50 sends the extracted machining technique information to the CAM 20.

The CAM 20 presents the machining technique information received from the machining technique management unit 50 to the user who creates the machining command, as a proposal for writing in the machining contents. The user can create a machining command, by deciding the machining contents such as what kind of machining is to be done using which tool, while making reference to this machining technique information.

Herein, although knowledge of the machining technique is required in order to decide the machining contents, since if it possible to make reference to the significant machining technique information according to the present embodiment, it becomes possible to create a high-quality machining command irrespective of the knowledge of the individual user.

<Presentation Operation of Machining Technique Information>

Figure 10:
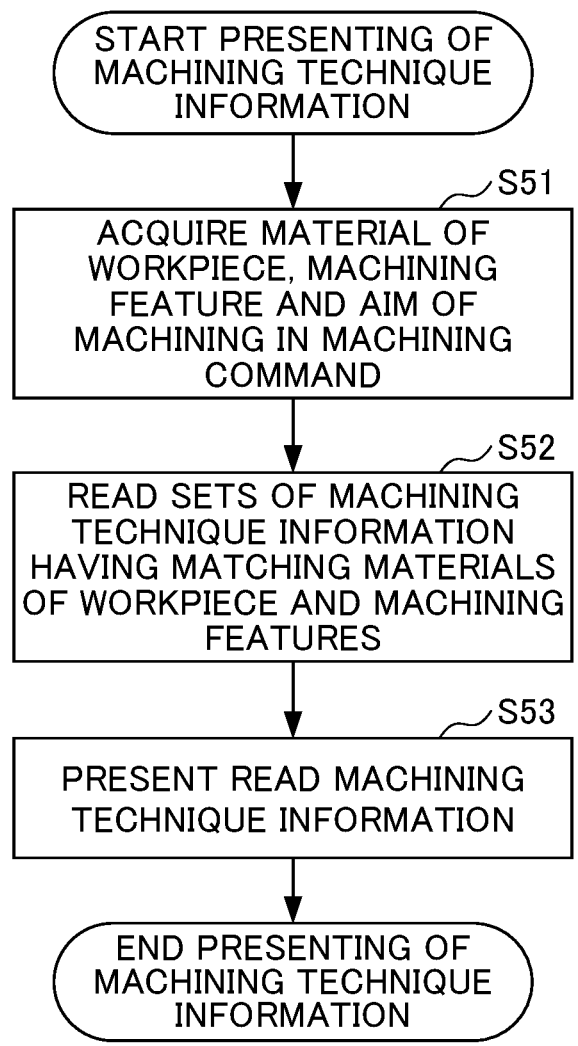
FIG. 10 is a flowchart showing operations during presentation of machining technique information of an embodiment of the present invention.

Next, an explanation will be made by referencing the flowchart of FIG. 10 for the operations upon the machining technique management unit 50 presenting machining technique information to a user creating a machining command in the aforementioned way.

<Presentation Operation of Machining Technique Information>

In Step S51, the machining technique management unit 50 acquires from the CAM 20 the material of the workpiece, machining feature and aim of machining which correspond to the machining command to be created from thereon by the user.

In Step S52, by way of searching the shared database 60, the machining technique management unit 50 extracts machining technique information corresponding to the information acquired in Step S51. More specifically, by way of searching the shared database 60, the machining technique management unit 50 extracts machining technique information for which all of the material of the workpiece, machining feature and aim of machining match, which was acquired in Step S51.

In addition, the machining technique management unit 50 also extracts machining technique information in which the aim of machining does not match, but the material of the workpiece and machining feature match, which was acquired in Step S51, by way of searching the shared database 60. This is because there are also cases where machining technique information having different aims of machining serve as reference.

The machining technique management unit 50 sends the machining technique information extracted in this way to the CAM 20. In Step S53, the CAM 20 presents the received machining technique information to the user. For example, the contents of machining technique information are presented by displaying on a display possessed by the CAM 20. The present processing thereby ends.

<Effects Exerted by Present Embodiment>

According to the present embodiment explained above, every time a machining command is executed by the CNC machine tool 30, the machining execution information is saved, and the machining technique information analyzed and extracted according to indices such as the aim of the user is accumulated. Then, it is possible to present the machining technique information corresponding to the machining command to be created, upon the user creating a machining command with the CAM 20. For this reason, according to the present embodiment, it becomes possible to create a high-quality machining command irrespective of the knowledge of individual users.

In addition, in the case of performing actual machining using a machining command created with the conventional technology, there has been a problem in that managing the machining technique information is difficult when changing a machining command on site such as at a factory in order to allow for better machining. However, according to the present embodiment, since the machining execution information is generated based on the machining command, etc. actually used in machining, it becomes possible to appropriately manage the machining technique information even in a case such that changes the machining command on site such as at a factory.

In addition, with the conventional technology, there has been a problem in that, after creating a machining command, the conventional machining technique is universally used for various manufactured articles as is without feedback to the machining result. However, according to the present embodiment, it is possible to solve the problem in there not having been feedback, since it is possible to present to the user information reflecting feedback to the machining result such as the machining execution information.

<Cooperation of Hardware and Software>

It should be noted that each of the respective devices and respective parts included in the above-mentioned integrated system can be realized by way of hardware, software or a combination of these. It should be noted that the machining technique management method performed by each of the respective devices and respective parts included in the above-mentioned integrated system can also be realized by way of hardware, software or a combination of these. Herein, being realized by way of software indicates the matter of being realized by a computer reading out and executing programs.

The programs used in the present invention can be stored using various types of non-transitory computer readable media, and supplied to computers. The non-transitory computer readable media includes various types of tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber, or a wireless communication path.

In addition, the aforementioned embodiment is a preferred embodiment of the present invention; however, it is not to limit the scope of the present invention to only the above-mentioned embodiment, and implementation in forms arrived at by conducting various modifications of a scope not departing from the gist of the present invention is possible.

First Modified Example

In the aforementioned embodiment, the machining technique management unit 50 conducted management such as updating of machining technique information stored in the shared database 60. In addition to this, it may be configured so that the user can perform editing of machining technique information stored in the shared database 60.

Figure 11:
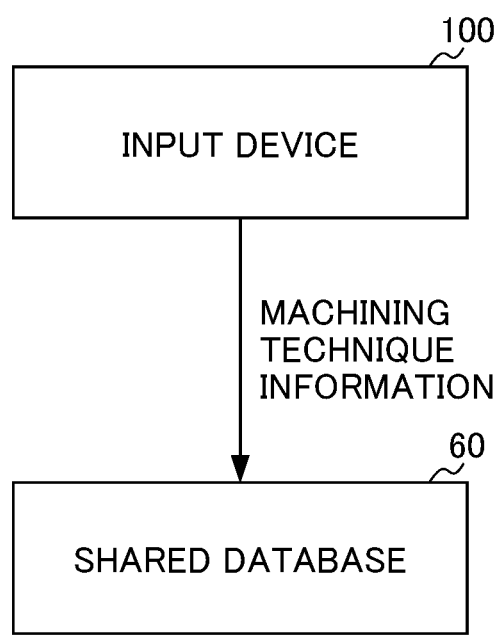
FIG. 11 is a view showing a first modified example of the embodiment of the present invention.

For this reason, an input device 100 is connected to the shared database 60, as shown in FIG. 11. Then, by the user manipulating this input device 100, editing of the machining technique information stored in the shared database 60 is performed. Alternatively, the user performs editing of the machining technique information stored in the shared database 60, using the device realizing the machining technique management unit 50. Then, for example, in the case of the machining technique information corresponding to a certain combination of the material of the workpiece, machining feature and aim of machining not being stored in the shared database 60, the user newly stores machining technique information. In addition, for example, update and deletion of machining technique information is performed by the user.

Second Modified Example

Figure 12:
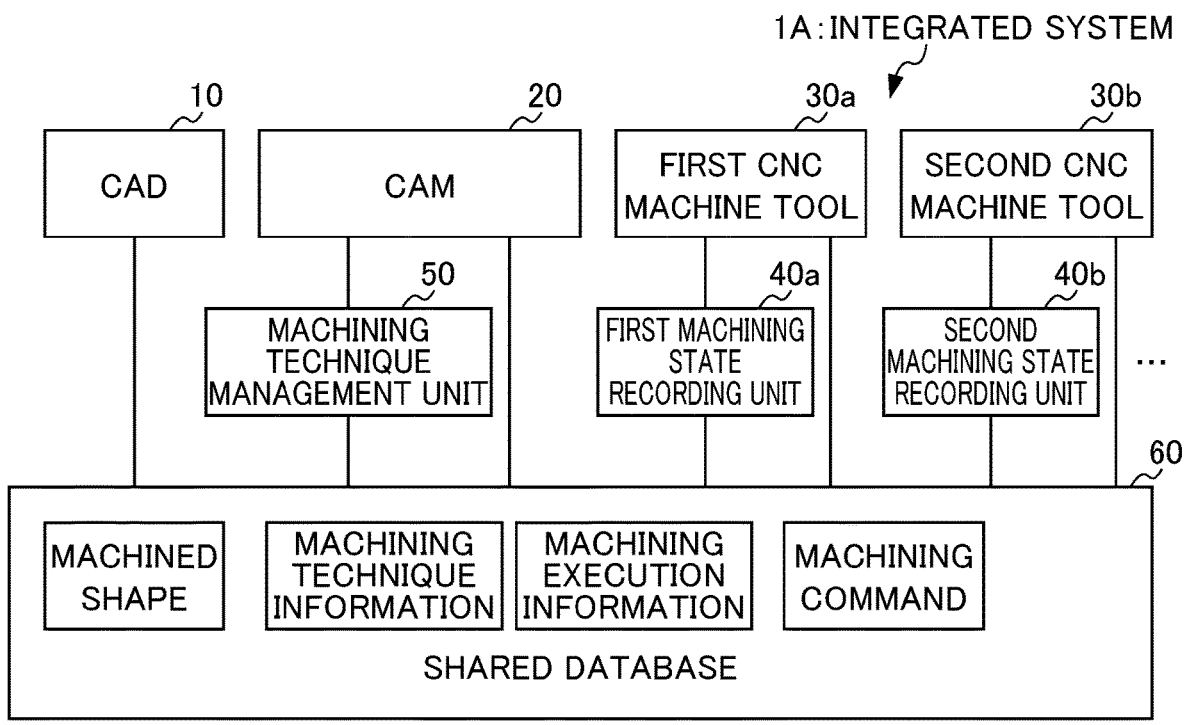
FIG. 12 is a view showing a second modified example of the embodiment of the present invention.

In the aforementioned embodiment, a group of the CNC machine tool 30 and machining state recording unit 40 are included as one group in the integrated system 1, as shown in FIG. 1. In contrast, it may be configured so that a plurality of the groups of the CNC machine tool 30 and the machining state recording unit 40 are included. For example, it may be configured so that the two groups of the group of a CNC machine tool 30a and machining state recording unit 40a, and the group of a CNC machine tool 30b and machining state recording unit 40b are included, as in the integrated system 1A shown in FIG. 12. Then, it is good to configure so that each of the plurality of groups shares the shared database 60. By configuring as a large scale system in this way, it is possible to collect a greater amount of machining execution information.

Then, by the machining technique management unit 50 selecting the significant information from the abundant machining execution information collected from this plurality of groups, it becomes possible to raise the quality of machining technique information. In addition, if establishing such a configuration, for example, upon using a new technique such as conducting test machining with a new tool in the CNC machine tool 30a, it becomes possible to apply the new technique from actual results by the CNC machine tool 30a also in the CNC machine tool 30b, for which management is performed by another manager.

Third Modified Example

It may be configured so that, in the case of a user or inspection equipment (not illustrated) performing inspection by measuring the workpiece machined by the CNC machine tool 30, the machining technique management unit 50 includes the inspection results thereof in the machining execution information.

In the present modified example, first, it is necessary to link the machining execution information with the workpiece corresponding to this machining execution information. Therefore, the machining technique management unit 50 assigns an individual identification number to the workpiece. Then, the machining technique management unit 50 associates this individual identification number and the machining step name in the machining execution information stored in the shared database 60.

Then, the machining technique management unit 50 assigns an individual identification number of the corresponding workpiece to the respective information of measurement information acquired by the user or inspection equipment measuring the workpiece with a measurement instrument (not illustrated), inspection information that is the result is inspecting based on the measurement information, and measurement related information for associating the machining that is being reflected when which machining step is executed by the respective data entries of the measurement information and the inspection information, and stores in the shared database 60.

Figure 13:
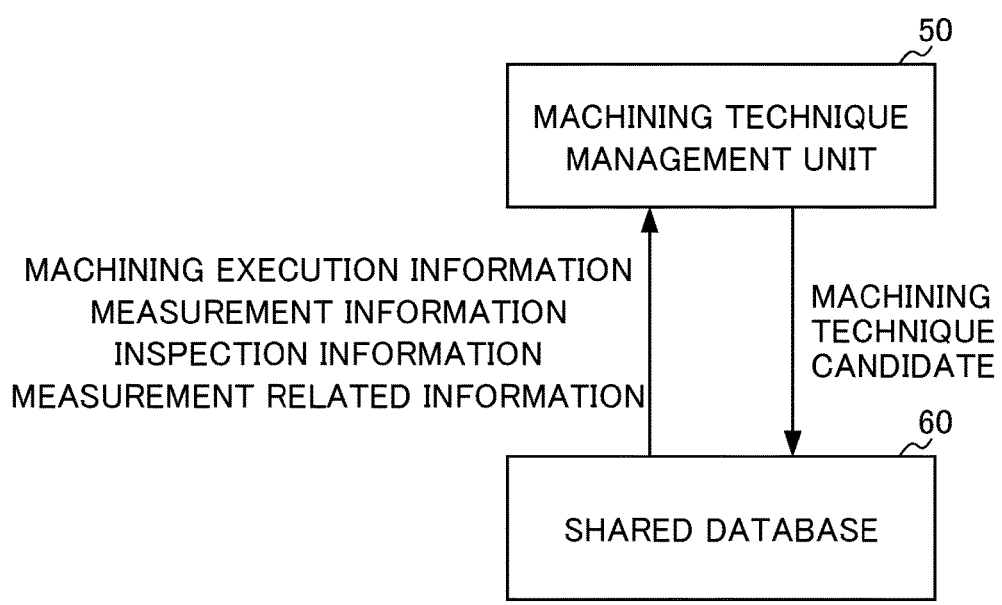
FIG. 13 is a view showing a third modified example of the embodiment of the present invention.

The machining technique management unit 50, upon selecting a machining technique candidate, acquires the machining execution information, measurement information, inspection information and measurement related information, for which the same individual identification number is linked to each, as shown in FIG. 13.

Then, by analyzing these sets of information, the machining technique management unit 50 analyzes what kind of the machining results are achieved in what kind of machining state when performing which machining, and then what happened to the inspection results. Then, based on this analysis result, the machining technique management unit 50 comes to be able to extract a better machining technique from among the machining execution information, and comes to be able to create a more beneficial machining technique candidate.

As an example of a method of the user or inspection equipment measuring the workpiece by a measurement instrument, for example, a method of measuring surface roughness of the workpiece by a surface roughness tester, a method of measuring the diameter of the workpiece with a 3-point micrometer, a method of measuring the flatness, parallelism, perpendicularity, positional deviation, etc. by a three-dimensional measurement instrument, and a method of measuring the dimensions of the workpiece by Vernier calipers can be exemplified.

As inspection by the user or inspection equipment, quality inspection whereby the user or inspective device judges as a "good article" in the case of the shape of the workpiece being within a designated range, and judges as "inferior article" in the case of the shape of the workpiece being outside of the designated range, based on the measurement information obtained by such measurement methods, and an instruction drawing for creating the workpiece can be given as an example.

In addition, as a method of using the inspection results by the machining technique management unit 50, for example, a method of calculating the defective rate based on the inspection results of quality inspection, and selecting machining execution information having the lowest defective rate as the machining technique candidate can be given as an example.

Furthermore, the machining technique management unit 50 may be configured so as to complete information that is deficient in the machining execution information, for example, by way of the measurement information. For example, in the case of there not being a designation such as how much surface roughness in the machining request information of the machining execution information obtained when machined, the surface roughness may not be included in the machining execution information. In such a case, it may be configured so that, in the case of the measurement results from the user or inspection equipment measuring the workpiece having a surface roughness of Ra 3.2, the machining technique management unit 50 adds this surface roughness to the machining execution information. The machining technique management unit 50 thereby can rewrite as machining execution information satisfying the surface roughness Ra 3.2, and in the case of there being a designation for the surface roughness in the machining request information, becomes able to extract as a machining technique candidate.

Fourth Modified Example

In the aforementioned embodiment, the CAD 10, CAM 20 and CNC machine tool 30 are illustrated as separate devices; however, it may be configured so as to realize a part or the entirety of the functions of the devices which are these separate bodies by way of the same device. For example, it may be configured so as to realize the CAD 10 and CAM 20 by the same device.

In addition, alternatively, although the machining technique management unit 50 and machining state recording unit 40 may be realized by a device for realizing these, for example, they may be realized as a part of the functions of a device realizing the CAD 10, CAM 20 and CNC machine tool 30. Furthermore, it may be configured as a decentralized processing system, which distributes the respective functions of each device to a plurality of servers as appropriate. In addition, it may be configured so as to utilize virtual server functions, etc. on a cloud.

EXPLANATION OF REFERENCE NUMERALS

1, 1A integrated system
10 CAD
10 CAM
30 CNC machine tool
30a first CNC machine tool
30b second CNC machine tool
40 machining state recording unit
40a first machining state recording unit
40b second machining state recording unit
50 machining technique management unit
60 shared database
100 input device

What is claimed is:

1. A machining technique management system of an integrated system in which a CAD that outputs a machined shape; a CAM which creates a machining command for machining a workpiece into the machined shape; and a CNC machine tool which performs machining based on the machining command and outputs a machining execution state, are connected to a shared database, the machining technique management system managing the machining technique state based on the machined shape, the machining command and the machining execution state, the machining technique management system comprising:

a processor; and
a non-transitory memory having executable instructions stored therein, which when executed, cause the processor to perform:
recording, in a case of the CNC machine tool executing the machining, request information indicating a request demanded in the machining, and state information indicating the machining execution state to be associated as machining execution information in the shared database;
comparing each of a plurality of sets of the machining execution information in which at least part of the request information matches;
defining machining execution information which was determined as satisfying a request in the request information better than other machining execution information based on a comparison result, as a candidate for machining technique information to be used for creation of the machining command at the CAM; and
using the candidate machining technique information to create the machining command, wherein the created machining command is used by the CAM.

2. The machining technique management system according to claim 1,
wherein when executed, the executable instructions further cause the processor to perform:
comparing the candidate for the machining technique information and existing machining technique information for which at least part of the request information matches with the candidate for the machining technique information; and recording, in a case of determining based on a comparison result that the candidate for the machining technique information better satisfies the request in the request information, in the shared database the candidate for the machining technique information as new machining technique information.

3. The machining technique management system according to claim 2, wherein when executed, the executable instructions further cause the processor to perform outputting, to the CAM, machining technique information that is recorded in the shared database and corresponds to a machining command to be created, in a case of the machining command being created at the CAM.

4. The machining technique management system according to claim 1, wherein information indicating an aim of machining by the user having created the machining command is included in the request information, and wherein at least part of the request information matching indicates at least the aim of machining matching.

5. The machining technique management system according to claim 1, wherein the request information is included in the machining command for every machining step, and wherein the processor records the state information and the machining step including the request information in the shared database to be associated as machining execution information, for each of the machining steps.

6. The machining technique management system according to claim 1, wherein the shared database allows for editing by a user.

7. The machining technique management system according to claim 1, wherein a plurality of the CNC machine tool corresponding to the plurality of the CNC machine tool are connected to the shared database.

8. The machining technique management system according to claim 1, wherein when executed, the executable instructions further cause the processor to perform:

acquiring an inspection result obtained by measuring the workpiece machined by the CNC machine tool; and determining whether or not satisfying a request in the request information based on the inspection result in addition to the state information.

9. A machining technique management method for an integrated system in which a CAD which outputs a machined shape; a CAM which creates a machining command for machining a workpiece into the machined shape; and a CNC machine tool which performs machining based on the machining command and outputs a machining execution state are connected to a shared database, the machining technique management method managing machining technique states based on the machined shape, the machining command and the machining execution state, the method comprising the steps of:

recording, in a case of the CNC machine tool executing the machining, a machining step including request information indicating a request demanded in the machining, and state information indicating the machining execution state to be associated as machining execution information in the shared database;

comparing the state information of a plurality of sets of the machining execution information for which at least part of the request information match, and defining machining execution information which was determined as satisfying the request in the request information better than other machining execution information based on the state information thus compared, as a candidate for machining technique information to be used for creation of the machining command at the CAM; and using the candidate machining technique information to create the machining command, wherein the created machining command is used by the CAM.

* * * * *